United States Patent [19]

Sprangers et al.

[11] 4,399,090
[45] Aug. 16, 1983

[54] METHOD OF PRODUCING MOULDINGS AND LAYERS OF INORGANIC MATERIALS

[75] Inventors: Wilhelmus Sprangers, Oosterhout; Rinse Dijkstra, Eindhoven, both of Netherlands

[73] Assignee: U.S. Philips Corporation, New York, N.Y.

[21] Appl. No.: 194,159

[22] Filed: Oct. 6, 1980

[30] Foreign Application Priority Data

Oct. 18, 1979 [DE] Fed. Rep. of Germany ....... 2942109

[51] Int. Cl.³ .................. C04B 35/64; B29C 25/00; B05D 3/02
[52] U.S. Cl. .................................. 264/63; 264/44; 264/66; 264/234; 427/64; 427/87; 427/88; 427/226; 427/229
[58] Field of Search ............... 252/600, 518, 519, 521; 350/357; 264/63, 59, 64, 66, 56, 65, 44, 234, 344, 345; 427/64, 88, 87, 229, 226

[56] References Cited

U.S. PATENT DOCUMENTS

| | | | |
|---|---|---|---|
| 3,359,226 | 12/1967 | Giddings et al. | 252/600 |
| 3,370,026 | 2/1968 | Patella et al. | 252/600 |
| 3,454,510 | 7/1969 | Newland | 264/63 |
| 3,576,755 | 4/1971 | Patella et al. | 252/600 |
| 3,812,214 | 5/1974 | Markovitz | 252/600 |
| 3,846,146 | 11/1974 | Hunting et al. | 106/73.4 |
| 3,850,844 | 11/1974 | Ho | 264/63 |
| 3,856,518 | 12/1974 | Strik et al. | 96/1 R |
| 3,864,293 | 2/1975 | Miyoshi et al. | 264/63 |
| 3,932,310 | 1/1976 | Turner | 264/63 |
| 3,935,141 | 1/1976 | Potts et al. | 264/63 |
| 3,973,439 | 8/1976 | Smith et al. | 73/339 R |
| 3,992,498 | 11/1976 | Morton et al. | 264/63 |
| 4,010,233 | 3/1977 | Winter et al. | 264/63 |
| 4,056,588 | 11/1977 | Baniel et al. | 264/63 |
| 4,094,690 | 6/1978 | Morton | 264/63 |
| 4,320,074 | 3/1982 | Birchall et al. | 264/63 |

FOREIGN PATENT DOCUMENTS

| | | | |
|---|---|---|---|
| 1948017 | 3/1971 | Fed. Rep. of Germany | 264/63 |
| 1095450 | 6/1955 | France | 264/63 |
| 50-115286 | 9/1975 | Japan | 264/63 |
| 55-11208 | 1/1980 | Japan | 350/357 |
| 55-110223 | 8/1980 | Japan | 350/357 |
| 55-149920 | 11/1980 | Japan | 350/357 |
| 1135656 | 12/1968 | United Kingdom | 264/63 |

OTHER PUBLICATIONS

Klem, C. G., IBM Tech. Discl. Bull., vol 10, No. 8, p. 1327 (Jan. 1968).

*Primary Examiner*—Teddy S. Gron
*Attorney, Agent, or Firm*—Norman N. Spain

[57] ABSTRACT

Bake out is accelerated and made possible at a lower temperature when at least one metal organic compound defined by the general formula $$M R_n$$

in which
$M = V^{III}, Mn^{II}, Mn^{III}, IN^{III}, Ca, Co^{III}, Ni^{II} (VO)^{II}$ or $(VO)^{III}$
$n = 2$ or $3$
$R$ = an organic residue of the compound classes of polyunsaturated compounds, aminoalcohols, aminoacids, carboxylic acids, hydroxycarboxylic acids, mercaptocarboxylic acids, enolisable ketones, ketoximes, aldoximes, amines, and phosphines which is capable of changing into an oxide of M when heated to 150° to 420° C. is dissolved in the starting mixture or added to the starting mixture in the form of a solution.

8 Claims, No Drawings

METHOD OF PRODUCING MOULDINGS AND LAYERS OF INORGANIC MATERIALS

The invention relates to a method of producing mouldings and layers of inorganic material in which polymeric organic materials, which are afterwards removed by combustion, are added to a starting mixture containing the inorganic materials.

Mouldings must here be understood to mean, for example, moulded ceramic products. In as far as inorganic materials are concerned they are, for example, produced with a ferrite. In these cases the polymer materials serve, for example, as a binder. German Offenlegungsschrift No. 2,509,696 discloses, for example, a method of producing sintered ceramics, in which the ceramic blanks which contain sinterable ceramic materials and combustible organic binders are heated so that the organic binders are decomposed.

Layers of inorganic materials must be understood to mean, for example, luminescent or fluorescent layers on luminescent screens. GB patent specification No. 11 35 656 and German Offenlegungsschrift No. 1,948,017 disclose, for example, methods of producing luminescent screens for cathode ray tubes. In the method described in German Offenlegungsschrift No. 1,948,017 a luminescent material which is included in a sedimentation liquid on a luminescent screen support is deposited onto the luminescent screen support. A 0.2–1% polyvinyl alcohol solution is, for example, used as the sedimentation liquid. After the luminescent material has settled on the support, the sedimentation liquid is decanted. Thereafter, the luminescent screen is dried and then heated for approximately one and a half to two hours at a temperature of approximately 430° C. According to GB patent specification No. 1,135,656 the production of plural luminescent material dot patterns for luminescent screens of colour picture tubes involves the formation of sequential layers of light-sensitive resistance elements incorporating the individual luminescent screen elements and the subsequent removal of the organic binder for such luminescent materials. The luminescent materials for forming the individual colour elements of such a luminescent screen (red, blue, green) are applied one after the other onto the screen surface by exposing predetermined areas of photo-sensitive films containing such materials to actinic light and subsequent development of the exposed films to form the individual luminescent material elements. The luminescent material-containing photosensitive coating compositions used contain, inter alia, an organic colloid, a sensitizer and the luminescent material. The organic colloid, which forms approximately 2 to 5% of the coating composition, may be a colloidal polyvinyl alcohol or a colloidal polyvinyl acetate. Also in this method the luminescent screen is heated, in order that the light-hardened polyvinyl alcohol or other organic colloids of the composite resistance layer are volatilized and removed, the desired pattern consisting of green, blue and red luminescent material elements remaining behind as triads or line patterns.

From U.S. PS No. 3,856,518 (=GB PS No. 1,358,147) it is known that in the electrophotographic production of a picture screen of a colour television picture tube an electrically conductive layer and a photoconductive layer, both of which layers can be removed by firing, are deposited on the electrically conductive layer on the face-plate of the tube, after which luminescent material elements of a first pattern and subsequent patterns as well as a light-absorbing layer between the luminescent material elements are applied electrophotographically. After the luminescent elements have been applied the faceplate is baked out to removed the electrically conductive and the photoconductive layers.

The electrically conductive layer usually consists of polymerizates, for example poly-diallyl-dimethyl-ammonium chloride, polyvinyl benzyl-trimethyl-ammonium chloride, copolymers of styrene with sodium or potassium maleate and poly-epichlorhydrin quaternated with a tertiary amine. The photoconductive layer usually consists of polymerizates, such as, for example, poly-N-vinyl carbazole (PVK), poly-acenaphthylene and poly-q-acryloylic carbazole. These materials are usually applied in the form of a solution onto the faceplate or onto the preceding layer, whereafter the solvent is evaporated. Customary solvents are chlorobenzene, tetrahydrofuran (THF), methylene chloride or tetra-chloroethene (for PVK), toluene or chloroform (for poly-acenaphthylene) and benzene or chloroform (for poly-9-acryloylic carbazole).

Baking out of the polymer materials, for example in the binder, the sedimentation liquids, the electrically conductive layers and the photoconductive layers, is usually carried out by means of a heat treatment at approximately 450° C., the baking temperature depending on the type of material, that is to say on the decomposition temperatures of the polymer materials contained in the moulding and layers. This requires big and expensive furnaces, which results in considerable energy costs. In addition, the high baking temperature often results in shrinkage of the mouldings or distortion of the faceplate, causing the distance between the faceplate and the aperture mask to change locally. Furthermore, the number of rejects is high or high post-processing expenses are necessary.

It is an object of the invention to accelerate the bakeout of the polymeric organic materials, for example those present in the above-mentioned binders, sedimentation liquid, electrically conductive and photo-conductive materials, and to allow the bakeout to be carried out at a lower temperature. It is therefore an object of this invention to provide an improved baking procedure in which the bakeout, which is essentially an oxidizing decomposition, which results in a disappearance of the polymer components, is carried out at a lower temperature than known sofar, without causing
 (a) the baking period to become longer and
 (b) the properties of the mouldings and layers to be affected detrimentally.

According to the invention this object is accomplished by a method of producing mouldings and layers of inorganic materials in which polymeric organic materials, which are afterwards removed by combustion, are added to a starting mixture containing the inorganic materials and in which at least a metal organic compound defined by the general formula $MR_n$ in which
 $M = V^{III}, Mn^{II}, Mn^{III}, In^{III}, Ca^2, Co^{III}, Ni^{II}, VO^{II}$ or $VO^{III}$
 $n = 2$ or $3$
 $R =$ an organic radical of the compound classes of polyunsaturated compounds, amino acids, aminoalcohols, carboxylic acids, hydroxycarboxylic acids, mercaptocarboxylic acids, enolisable ketones, ketoximes, aldoximes, amines and phosphines. which can be converted into an oxide of M, when heated to 150° C. to 420° C., is dissolved in the starting mixture or added in the solved state to the starting mixture.

The component which is the actually effective during bakeout is metal oxides. As these oxides are insoluble in the solvents, for example chlorobenzene or tetrahydrofurane, which are suitable for polymer organic materials, metal organic compounds are selected which are properly soluble in these solvents and which are converted into oxides during bakeout, so that these oxides are uniformly and molecularly distributed in the mouldings or in the layer and accelerate bakeout to the maximum extent.

"Properly soluble" is defined within the scope of the invention as solubilities from 1 to 10% (wt/wt).

Preferably, the materials which do not only contain carbon and hydrogen but also oxygen and/or nitrogen are selected from the above-mentioned classes of organic materials. Compounds which contain additional elements, for example sulphur or phosphor are less desirable in view of the side products they form during the oxidizing decomposition, for example sulphur dioxide and phosphor oxide.

Examples of preferred compounds are metal-octoates and -naphthenates and metal compounds of acetylacetonate, acetic acid esters and dimethyl glyoxime. Compounds which are particularly preferred are:

Mn $(C_5H_7O_2)_3$ manganese(III) acetylacetonate
VO $(C_5H_7O_2)_3$ vanadium oxyacetylacetonate
V $(C_5H_7O_2)_3$ vanadium acetylacetonate
VO $[N(CH_3)_2]$ tris-(dimethylamino)-vanadyl.

The baking temperature decreases with an increasing concentration of metal organic compound. Preferably, concentrations of 0.5 to 3% are used calculated with respect to the weight of the polymer organic materials.

In the qualitative and quantitative selection of the metal organic compounds care should be taken to ensure that the properties of the polymer materials and thus, for example, of the binders, the sedimentation liquid, the electrically conductive layers and the photoconductive layers are affected to little or no extent before baking. To enable this selection it is simple to find out how large, for example, the negative influence of the selected compounds is on the photo-conductivity of a poly-N-vinyl carbazole, by means of a pilot test. Furthermore, the decomposition temperature of the selected metal organic compound can be determined in a simple manner by means of pilot tests.

The advantages of the method according to the invention reside particularly in that a simple addition of metal organic compounds in small quantities to dissolve the photo-conductive materials solves the baking problems and in that the production procedures for the mouldings and layers need not be changed.

The invention will now be further explained with reference to following examples.

EXAMPLE 1

1% by weight of manganese (III)-tris-2.4-pentane dionate (maganese(III)acetylacetonate) (0.6 grams) was added to a solution of 60 grams of poly-N-vinyl carbazole (PVK) per liter of chlorobenzene and 12 grams of a dialkylphthalate as the softening agent and the mixture was stirred overnight, until a clear solution was obtained.

With this solution a photo-conductive layer was sprayed onto a faceplate which had already been coated with an electrically conductive layer, it being possible to readjust the viscosity by adding chlorobenzene.

Instead of chlorobenzene, THF and methylene-chloride were, alternatively, used, 60 g PVK being dissolved per liter of THF and methylene chloride, respectively. The photo-conductive layer was not sprayed but applied by spinning or by means of a brush.

In order to obtain solutions having a higher manganese (III)-acetylacetonate content, a concentrated PVK-softening agent solution in fluorobenzene or THF and a concentrated solution of the manganese (III) compound is taken as the starting point, in deviation from the above example. In this manner difficulties in dissolving the manganese (III)-acetylacetonate are avoided. Starting from a 5% by weight solution of a Mn(III) compound and a 100 g/l PVK solution, the desired quantities are mixed together to obtain a solution which contains approximately 60 g/l PVK and 3% by weight of manganese (III) compound (calculated with respect to the PVK weight) and the mixture thus obtained is stirred for at least 24 hours.

Thereafter, three different luminescent materials are electrophotographically applied onto the screen and the electrically conductive and photoconductive layers are baked out. Layers without a manganese (III) compound must be heated to 450° C., whereas it is sufficient to heat layers comprising 1 or 3% by weight of the manganese compound to 420° or 400° C., to accomplish complete removal of the organic materials. The very small quantity of metal oxide residues have no disturbing aftereffects in the finished tubes, that is to say the brightness of the luminescent materials is not affected.

EXAMPLE 2

0.6 grams of vanadium (III)oxide-bis-(2.4-pentanedionate) was added to a solution of 60 g poly-N-vinyl carbazole with 20% of a softening agent per liter of chlorobenzene, as described for example 1, and the mixture is stirred overnight. In the same way as in example 1, the photoconductive layer can be applied onto the faceplate with this solution.

Also solutions having a higher vanadium oxide-tris-acetylacetonate content can be produced. A solution of 5% by weight of the vanadium(III)-oxide compound in chlorobenzene (or THF) and a solution of 100 g/l of PVK are produced. The two solutions are mixed together so that a solution of 60 g/l PVK with 3% by weight of vanadium (III)-oxide-tris-acetylacetonate is obtained, and the mixture is stirred for at least 24 hours. Thereafter, as described hereinbefore, the three different luminescent materials are applied to the screen and the electrically conductive and photo-conductive layers are baked. Layers having 1 or 3% by weight of vanadium-oxide compound can be fully baked out at a lower temperature (approximately 420° and approximately 400° C., respectively).

What is claimed is:

1. In the method of forming a molding or a layer of an inorganic material by forming a mixture of said inorganic material and a polymeric organic material, molding said mixture into a desired configuration or depositing a layer of said mixture on a substrate and then removing said polymeric organic compound from the resultant molding or layer by subjecting said layer or molding to baking at a temperature of from 150° C.–420° C. for a time sufficient to cause said polymeric organic compound to be volatilized and removed, the improvement wherein prior to the baking there is added to said mixture a metallic organic compound of the general formula M Rn wherein M = $V^{III}$, $Mn^{II}$, $Mn^{III}$, $In^{III}$, $Ca^{II}$, $Co^{III}$, $Ni^{II}$, $VO^{II}$ or $VO^{III}$ N = 2 or 3 and R = an organic residue of polyunsaturated compounds, carboxylic acids, enolisable ketones, ketoximes, aldoximes, amines or phosphines, and capable of being converted to an oxide of M when heated to 150° C.–420° C.

2. The method of claim 1, characterized in that in the organic moiety of the metallic organic compound there is present oxygen and/or nitrogen along with carbon and hydrogen.

3. The method of claim 1, wherein the metallic organic compound is an octoate, naphthenate, acetylacetonate or dimethyl glyoxime.

4. The method of claim 3, wherein the metallic organic compound is selected from the group consisting of manganese (III)-acetylacetonate, vanadium oxy-acetylacetonate, vanadium acetylacetonate and tris (dimethylamino)-vanadyl.

5. The method of claim 1, wherein the concentration of the metallic organic compound is 0.5–3% based on the weight of the polymeric organic material.

6. The method of claim 3, wherein the concentration of the metallic organic compound is 0.5–3% based on the weight of the polymeric organic material.

7. The method of claim 4, wherein the concentration of the metallic organic compound is 0.5–3% based on the weight of the polymeric organic material.

8. The method of claim 1, wherein the R residue is that of an amino acid, an hydroxycarboxylic acid, or an aminoalcohol.

* * * * *